United States Patent [19]
Parry et al.

[11] 3,951,671
[45] Apr. 20, 1976

[54] OPHTHALMIC GLASS COMPOSITIONS

[75] Inventors: Richard John Parry, Southport; Reginald Dunning, Parbold, Nr. Wigan, both of England

[73] Assignee: Pilkington Brothers Limited, St. Helens, England

[22] Filed: Nov. 29, 1974

[21] Appl. No.: 528,573

[30] Foreign Application Priority Data
Dec. 6, 1973 United Kingdom............... 56656/73

[52] U.S. Cl. .................................. 106/52; 65/30 E; 106/54
[51] Int. Cl.² ...................... C03C 3/04; C03C 3/08; C03C 23/22
[58] Field of Search ................. 106/52, 54; 65/30 E; 351/159, 166

[56] References Cited
UNITED STATES PATENTS

| | | | |
|---|---|---|---|
| 2,779,136 | 1/1957 | Hood et al. ...................... | 106/52 X |
| 3,357,876 | 12/1967 | Rinehart ............................. | 65/30 |
| 3,790,260 | 2/1974 | Boyd et al............................ | 65/30 |

FOREIGN PATENTS OR APPLICATIONS

| | | |
|---|---|---|
| 2,300,014 | 7/1973 | Germany |
| 1,172,383 | 11/1969 | United Kingdom |

*Primary Examiner*—Helen M. McCarthy
*Attorney, Agent, or Firm*—Burns, Doane, Swecker & Mathis

[57] ABSTRACT

Ophthalmic glass compositions suitable for toughening by the known ion-exchange process have a composition in weight percentages of:

| | | | |
|---|---|---|---|
| $SiO_2$ | 58 | to | 67% |
| $Al_2O_3$ | 4.5 | to | 8.0% |
| $Na_2O$ | 8.5 | to | 17% |
| $K_2O$ | 2 | to | 11% |
| $ZnO$ | 0 | to | 10% |
| $ZrO_2$ | 0 | to | 6.5% |
| $TiO_2$ | 0 | to | 5.0% |
| $As_2O_3$ | 0 | to | 1% |
| $Sb_2O_3$ | 0 | to | 1% |
| $B_2O_3$ | 0 | to | 6% | the total of the foregoing constituents amounting to at least 95% of the composition and the balance, if any, being composed of compatible constituents; the composition including an effective amount of either one or both of ZnO and $ZrO_2$, to promote ion penetration in an ion-exchange toughening process, either one or both of $ZrO_2$ and $TiO_2$ being present; the total of $Na_2O + K_2O$ being not more than 22%; $B_2O_3$ being present when the total of $Al_2O_3 + ZrO_2$ exceeds 10%; and the total of $ZrO_2 + TiO_2$, when $TiO_2$ is present, being not more than 5.5%. Refractive index $n_d$ is close to the standard value of 1.523 and good penetration of the ion exchange is achieved in toughening, while the expansion coefficient makes the glass compatible with a standard flint glass in fused bi-focal lenses.

3 Claims, No Drawings

OPHTHALMIC GLASS COMPOSITIONS

BACKGROUND OF THE INVENTION

1. Field of the Invention

This invention relates to ophthalmic glass compositions, and more specifically to a glass composition for use in making ophthalmic lenses or lens blanks which can subsequently be toughened by an ion-exchange process.

2. Description of the Prior Art

It is well known that a freshly formed glass article has a high strength which is rapidly reduced by the formation of minor superficial abrasions in use, which form starting points for fractures when the article is put under stress.

A process of toughening glass by ion-exchange is known, for example, from British Specifications Nos. 966,733 and 1,172,383. It consists essentially in exchanging alkali metal ions (e.g $Na^+$ ions) in a surface layer of the glass for larger alkali metal ions (e.g $K^+$ ions), generally from a molten salt bath, at a temperature below the strain point of the glass, so as to cause a compressive stress in the surface layer thereby reducing the susceptibility to superficial abrasions and the tendency to start fractures therefrom. As described in the Specifications mentioned above, it is important that the depth of the surface layer affected by the compressive stress, i.e. the depth of penetration of the exchange ions, should be greater than that of the superficial abrasions caused in normal use of the article, and glasses of the $R_2O$ - $ZrO_2$ - $SiO_2$ type and particularly of the $R_2O$ - $ZrO_2$ - $Al_2O_3$ - $SiO_2$ type, have been found particularly useful in enabling an adequate depth of penetration to be achieved in a reasonably short time, thereby giving the article a relatively high abraded strength.

Glass compositions of the $R_2O$ - $ZnO$ - $Al_2O_3$ - $SiO_2$ type have also been found useful in this connection, as described in German Offenlegungsschriften 2,205,844 and 2,300,014.

SUMMARY OF THE INVENTION

The object of the present invention is to provide a range of ophthalmic glass compositions suitable for toughening by an ion-exchange process, which will have a particularly useful combination of optical and mechanical properties, e.g. a refractive index close to the standard figure for ophthalmic glasses and an expansion coefficient which will make the glass compatible with a standard flint glass of higher refractive index for use in fused bi-focal lenses.

According to the invention, an ophthalmic glass composition, suitable for toughening by an ion-exchange process, comprises the following constituents in percentages by weight:

| | | |
|---|---|---|
| $SiO_2$ | 58 to | 67% |
| $Al_2O_3$ | 4.5 to | 8.0% |
| $Na_2O$ | 8.5 to | 17% |
| $K_2O$ | 2 to | 11% |
| $ZnO$ | 0 to | 10% |
| $ZrO_2$ | 0 to | 6.5% |
| $TiO_2$ | 0 to | 5.0% |
| $As_2O_3$ | 0 to | 1% |
| $Sb_2O_3$ | 0 to | 1% |
| $B_2O_3$ | 0 to | 6% | the total of the foregoing constituents amounting to at least 95% of the composition and the balance, if any, being composed of compatible constituents; the composition including an effective amount of either one or both of $ZnO$ and $ZrO_2$ to promote ion penetration in an ion-exchange toughening process, either one or both of $ZrO_2$ and $TiO_2$ being present; the total of $Na_2O + K_2O$ being not more than 22%; $B_2O_3$ being present when the total of $Al_2O_3 + ZrO_2$ exceeds 10%; and the total of $ZrO_2 + TiO_2$, when $TiO_2$ is present, being not more than 5.5%.

The upper limit of 67% on the $SiO_2$ content is set by the fact that higher contents of $SiO_2$ would make the glass too viscous and hence result in problems in melting and refining it. With less than 58% it would be difficult to obtain the necessary optical and physical properties, in conjunction with the other components of the glass.

$Al_2O_3$ is included to assist penetration of the larger ions into the glass in the ion exchange process. The lower limit of 4.5% $Al_2O_3$ represents the minimum quantity needed to ensure sufficient penetration in glasses of this type, while the upper limit of 8% is dictated by the difficulty of melting a glass of this type containing higher amounts of $Al_2O_3$.

$Na_2O$ must of course be present to take part in the ion exchange process. At least 8.5% $Na_2O$ has been found necessary to produce a sufficient ion exchange reaction. If the $Na_2O$ content were higher than 17%, there would be a tendency for relaxation of the stress induced by the ion exchange process. It has been found necessary to have between 2 and 11% $K_2O$ present to promote the exchange of $K^+$ for $Na^+$ ions. We believe that $K_2O$ produces this effect by keeping the molecular structure of the glass open and thereby facilitating the ion exchange process. $Na_2O$ and $K_2O$ both affect the expansion coefficient of the glass and the total amount included must be not more than 22% and preferably between 17 and 22% in order to obtain an expansion coefficient in the desired range.

$ZnO$ may be included in amounts up to 10% because it has been found to be beneficial in increasing the depth of ion penetration achieved in the ion-exchange toughening process. It also has an effect on the expansion coefficient of the glass and the amount included can accordingly be selected, in the range up to 10%, to assist in controlling the expansion. $ZnO$, is, however, a relatively expensive component.

Both $ZrO_2$ and $TiO_2$ are also beneficial in increasing the depth of penetration. When $ZnO$ is present, it has been found necessary to use one or both of them in addition to $ZnO$, to achieve a good penetration at an economic cost. With quantities of $ZrO_2$ near the upper limit of 6.5%, however, both $ZnO$ and $TiO_2$ can be omitted. The upper limit of $ZrO_2$ is set by the difficulty of melting a glass of this type with higher contents of $ZrO_2$. A quantity of $ZrO_2$ between 3 and 6.5% has been found to enable an optimum depth of penetration to be achieved.

$TiO_2$ has a further beneficial effect in that a small quantity helps to inhibit any solarization which might occur in the glass, but the amount of $TiO_2$ has to be kept below 5% to avoid colouration of the glass.

When both $ZrO_2$ and $TiO_2$ are present, the total of these components must not exceed 5.5% in order to avoid melting difficulties and to keep the refractive index down to the required value.

$B_2O_3$ is of value in assisting melting. Its presence is essential when the total of $Al_2O_3 + ZrO_2$ exceeds 10%, but it may also be used with lower totals of $Al_2O_3 + ZrO_2$. The $B_2O_3$ content must not exceed 6% because the depth of ion penetration would thereby be reduced.

$As_2O_3$ and $Sb_2O_3$ are fining agents which may be added in amounts up to 1%.

The balance of compatible constituents may consist of up to 5% RO, where R represents one or more of the alkaline earth metals, preferably Mg.

DETAILED DESCRIPTION OF THE INVENTION

Specific embodiments of glass compositions according to the invention are listed by way of example in the following table, which indicates the weight percentages of the various constituents and the sum of $Na_2O + K_2O$ for each composition, and the sum of $Al_2O_3 + ZrO_2$ for each composition which contains both of these constituents. The table also lists the refractive index for the helium d line ($n_d$) and the expansion coefficient of the glass measured from 0° to 100°C. Samples of each glass composition were immersed for 16 hours in a bath containing 99% $KNO_3$, 0.5% $NaNO_3$ and 0.5% silicic acid at 470°C (which is below the strain point of all the glasses) to effect exchange of $Na^+$ ions in the glass for $K^-$ ions from the bath. The compressive stress thereby produced in the surface layer, and the depth of penetration of the exchange ions, are listed in the last two columns of the table.

| Glass No. | $SiO_2$ | $Al_2O_3$ | $B_2O_3$ | $Na_2O$ | $K_2O$ | ZnO | $ZrO_2$ | $As_2O_3$ | $TiO_2$ | MgO | $Sb_2O_3$ | $K_2O+ Na_2O$ | $Al_2O_3 ZrO_2$ |
|---|---|---|---|---|---|---|---|---|---|---|---|---|---|
| 35 | 65.00 | 6.00 | | 13.00 | 5.00 | 5.80 | | 0.20 | 3.00 | 2.00 | | 18.00 | |
| 36 | 63.55 | 7.50 | | 16.80 | 2.20 | 6.75 | | 0.20 | 3.00 | | | 19.00 | |
| 38 | 63.70 | 6.40 | | 14.12 | 3.88 | 8.70 | | 0.30 | 2.90 | | | 18.00 | |
| 40 | 67.00 | 4.50 | | 12.70 | 5.00 | 3.30 | | 0.20 | 4.30 | 3.00 | | 17.70 | |
| 42 | 67.00 | 4.50 | | 12.70 | 5.00 | 5.10 | 1.50 | 0.20 | 4.00 | | | 17.70 | 6.00 |
| 44 | 62.83 | 7.25 | | 12.60 | 5.54 | 8.38 | | 0.20 | 3.20 | | | 18.14 | |
| 45 | 63.70 | 6.40 | | 11.12 | 7.88 | 7.70 | | 0.30 | 2.90 | | | 19.00 | |
| 49 | 62.49 | 7.25 | | 12.60 | 5.90 | 8.38 | 1.20 | 0.20 | 2.00 | | | 18.50 | 8.45 |
| 52 | 63.26 | 6.83 | | 11.86 | 6.71 | 8.04 | | 0.25 | 3.05 | | | 18.57 | |
| 53 | 61.63 | 7.38 | 2.00 | 13.30 | 5.95 | 5.84 | 2.70 | 0.20 | 1.00 | | | 19.25 | 10.08 |
| 58 | 60.97 | 7.25 | 1.00 | 13.10 | 5.90 | 7.38 | 4.20 | 0.20 | | | | 19.00 | 11.45 |
| 60 | 60.80 | 7.50 | 4.00 | 14.00 | 6.00 | 3.30 | 4.20 | 0.20 | | | | 20.00 | 11.70 |
| 61 | 62.83 | 7.25 | | 12.60 | 5.54 | 8.38 | | 0.20 | 3.20 | | | 18.14 | |
| 62 | 60.80 | 7.80 | 4.00 | 14.00 | 7.00 | | 6.20 | 0.20 | | | | 21.00 | 14.00 |
| 64 | 60.80 | 7.25 | 4.00 | 14.00 | 6.00 | 3.00 | 4.50 | 0.20 | 0.25 | | | 20.00 | 11.75 |
| 65 | 60.80 | 7.50 | 4.50 | 13.94 | 6.00 | 2.86 | 4.20 | 0.20 | | | | 19.94 | 11.70 |
| 66 | 60.80 | 7.23 | 4.00 | 15.57 | 6.00 | | 6.20 | 0.20 | | | | 21.57 | 13.43 |
| 68 | 60.80 | 7.50 | 4.00 | 13.31 | 6.59 | 3.80 | 3.70 | 0.20 | 0.10 | | | 19.90 | 11.20 |
| 69 | 61.35 | 5.85 | 5.10 | 14.00 | 6.00 | 3.30 | 4.20 | 0.20 | | | | 20.00 | 10.05 |
| 72 | 60.93 | 5.84 | 5.09 | 14.27 | 5.99 | 3.29 | 4.19 | 0.40 | | | | 20.26 | 10.03 |
| 78 | 61.00 | 6.55 | 3.99 | 13.89 | 6.68 | 3.30 | 3.79 | | 0.40 | | 0.40 | 20.57 | 10.34 |
| 81 | 60.00 | 8.00 | 3.99 | 13.89 | 6.68 | 2.85 | 3.79 | 0.20 | 0.40 | | 0.20 | 20.57 | 11.79 |

| Glass No. | Refractive index $n_d$ | Expansion 0–100°C ($\times 10^{-7}$) | Compressive stress PSI ($\times 10^3$) | Ion exchange penetration Depth $\mu$ |
|---|---|---|---|---|
| 35 | 1.5207 | 86.2 | 46 | 80 |
| 36 | 1.5216 | 88.2 | 42 | 90 |
| 38 | 1.5256 | 86.5 | 48 | 80 |
| 40 | 1.525 | 83.0 | 44 | 80 |
| 42 | 1.5262 | 81.1 | 48 | 85 |
| 44 | 1.5250 | 85.6 | 55 | 95 |
| 45 | 1.521 | 86.4 | 48 | 95 |
| 49 | 1.5240 | 85.7 | 52 | 85 |
| 52 | 1.5249 | 86.3 | 50 | 95 |
| 53 | 1.5245 | 84.4 | 67 | 100 |
| 58 | 1.5254 | 87.3 | 57 | 110 |
| 60 | 1.5221 | 86.8 | 51 | 112 |
| 61 | 1.5264 | | 45 | 100 |
| 62 | 1.5229 | 84.3 | 47 | 120 |
| 64 | 1.5214 | 84.3 | 52 | 120 |
| 65 | 1.5221 | 86.0 | 56 | 105 |
| 66 | 1.5244 | 86.5 | 59 | 105 |
| 68 | 1.5245 | 89.6 | 54 | 100 |
| 69 | 1.5232 | 85.5 | 58 | 100 |
| 72 | 1.5239 | 86.6 | 52 | 100 |
| 78 | 1.5244 | | 68 | 118 |
| 81 | 1.5197 | | 60 | 128 |

| Glass No. | $SiO_2$ | $Al_2O_3$ | $B_2O_3$ | $Na_2O$ | $K_2O$ | ZnO | $ZrO_2$ | $As_2O_3$ | $TiO_2$ | MgO | $Sb_2O_3$ | $K_2O+ Na_2O$ | $Al_2O_3+ ZrO_2$ |
|---|---|---|---|---|---|---|---|---|---|---|---|---|---|
| 85 | 61.21 | 6.16 | 4.29 | 13.72 | 6.70 | 3.31 | 4.21 | | | | 0.40 | 20.42 | 10.37 |
| 86 | 61.21 | 6.16 | 4.29 | 13.72 | 6.70 | 3.31 | 4.01 | 0.20 | 0.20 | | 0.20 | 20.42 | 10.17 |
| 87 | 58.00 | 8.00 | 6.00 | 13.72 | 6.10 | 4.78 | 3.00 | 0.40 | | | | 19.82 | 11.00 |
| 88 | 61.76 | 7.23 | 2.74 | 15.57 | 6.00 | | 6.50 | 0.20 | | | | 21.57 | 13.73 |
| 89 | 62.95 | 5.85 | | 8.77 | 11.00 | 6.18 | 4.00 | 0.25 | 1.00 | | | 19.77 | 9.85 |
| 90 | 63.31 | 5.85 | | 11.86 | 7.91 | 5.84 | 4.00 | 0.25 | 1.00 | | | 19.77 | 9.85 |
| 91 | 60.82 | 7.25 | 1.44 | 12.81 | 5.90 | 8.58 | 3.00 | 0.20 | | | | 18.71 | 10.25 |
| 92 | 63.55 | 7.50 | | 17.00 | 2.00 | 6.75 | | 0.20 | 3.00 | | | 19.00 | |
| 93 | 62.10 | 7.00 | | 8.50 | 8.80 | 10.00 | | 0.30 | 3.30 | | | 17.30 | |
| 94 | 62.10 | 7.00 | | 8.50 | 10.70 | 9.00 | | 0.30 | 2.40 | | | 19.20 | |
| 95 | 65.00 | 6.00 | | 13.00 | 5.00 | 5.80 | | 0.20 | 5.00 | | | 18.00 | |
| 96 | 61.38 | 5.84 | 5.09 | 14.27 | 5.99 | 3.29 | 2.74 | 0.20 | 1.00 | | 0.20 | 20.26 | 8.58 |
| 97 | 61.21 | 6.16 | 4.28 | 13.72 | 6.69 | 3.31 | 4.21 | 0.20 | | | 0.20 | 20.41 | 10.37 |

| Glass No. | Refractive index $n_d$ | Expansion 0–100°C ($\times 10^{-7}$) | Compressive stress PSI ($\times 10^3$) | Ion exchange penetration Depth $\mu$ |
|---|---|---|---|---|
| 85 | 1.5242 | | 61 | 135 |
| 86 | 1.5238 | | 59 | 135 |
| 87 | 1.5232 | | 70 | 115 |
| 88 | 1.5279 | | 64 | 123 |
| 89 | 1.5234 | | 51 | 233 |
| 90 | 1.5272 | | 58 | 135 |
| 91 | 1.5229 | | 70 | 160 |
| 92 | 1.5267 | | | |
| 93 | 1.5267 | | 65 | 167 |
| 94 | 1.5280 | | 57 | 160 |
| 95 | 1.5287 | | | |
| 96 | 1.5261 | | 66 | 111 |
| 97 | 1.5229 | | 65 | 128 |

It will be seen that all the examples have a refractive index $n_d$ between 1.5197 and 1.5272 which is close to the accepted standard figure of 1.523 for ophthalmic glasses and thus facilitates the production of lenses by conventional procedures.

If the glass is to be used in fused bi-focal lenses, having components of this glass and of a flint glass of higher refractive index, the expansion coefficients of the two glasses must be closely matched to prevent separation at the fused joint. With a particular standard flint glass, the expansion of the lower refractive index glass should be between 85 and 88 $\times 10^{-7}$. It will be seen that expansion coefficients of all the examples lie in a range between 81.1 and 89.6 $\times 10^{-7}$, and could therefore be matched to a suitable flint glass.

The compressive stress produced by the ion-exchange treatment is satisfactorily high, being over 42,000 pounds per square inch in all cases. The depth of penetration is also excellent, being at least 80 $\mu$ in all cases. The minimum figures regarded as satisfactory are 40,000 p.s.i. and 70 $\mu$ respectively.

The preferred glasses are Nos. 60, 65, 66, 69, 72, 91 and 97. It will be noted that these preferred glasses all contain between 3.00 and 6.20% by weight $ZrO_2$. They have a refractive index $n_d$ between 1.5221 and 1.5244, an expansion coefficient between 85.5 and 86.8 $\times 10^{-7}$, a compressive stress in the surface layer after toughening of 51,000 to 70,000 p.s.i. and a depth of penetration of the ion exchange of 100 to 160 $\mu$.

We claim:

1. An ophthalmic glass composition having a refractive index between about 1.5197 and 1.5272 and an expansion coefficient (0°–100°C) between 81.1 and 89.6$\times 10^{-7}$ suitable for toughening by an ion-exchange process below the glass strain point, essentially of the following constituents in percentages by weight:

| | | |
|---|---|---|
| $SiO_2$ | 58 to | 67% |
| $Al_2O_3$ | 4.5 to | 8.0% |
| $Na_2O$ | 8.5 to | 17% |
| $K_2O$ | 2 to | 11% |
| $ZrO_2$ | 3 to | 6.5% |
| $TiO_2$ | 0 to | 5% |
| $As_2O_3$ | 0 to | 1% |
| $Sb_2O_3$ | 0 to | 1% |
| $B_2O_3$ | 0 to | 6% | and ZnO in an amount up to 10% and effective to control expansion coefficient and to promote ion penetration in an ion-exchange toughening process, the total of the foregoing constituents amounting to at least 95% of the composition and the balance, if any, being composed of compatible constituents; the total of $Na_2O$ plus $K_2O$ being between 17 and 22%; $B_2O_3$ being present when a total of $Al_2O_3$ plus $ZrO_2$ exceeds 10%; and the total of $ZrO_2$ plus $TiO_2$, when $TiO_2$ is present, being not more than 5.5%.

2. A glass composition according to claim 1, wherein the balance of compatible constituents consists of up to 5% of RO, where R represents one or more of the alkaline earth metals.

3. A glass composition according to claim 2 wherein R represents Mg.

* * * * *